(12) United States Patent
Smith et al.

(10) Patent No.: US 7,033,421 B1
(45) Date of Patent: Apr. 25, 2006

(54) SORPTION COOLING FOR HANDHELD TOOLS

(75) Inventors: Suzanne E. Smith, Itasca, IL (US); Gavin P. Towler, Barrington, IL (US); Stephen R. Dunne, Algonquin, IL (US); Anil R. Oroskar, Oakbrook, IL (US); Kurt M. Vanden Bussche, Lake in the Hills, IL (US); Lin Li, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 301 days.

(21) Appl. No.: 10/347,931

(22) Filed: Jan. 17, 2003

(51) Int. Cl.
*B01D 53/04* (2006.01)

(52) U.S. Cl. .......................... 96/135; 96/143; 96/147; 96/153; 96/154

(58) Field of Classification Search .................. 96/108, 96/135, 143, 146, 147, 154, 153
See application file for complete search history.

(56) References Cited

U.S. PATENT DOCUMENTS

| | | | |
|---|---|---|---|
| 2,770,932 A * | 11/1956 | Polye ........................... 53/402 |
| 3,638,403 A * | 2/1972 | Delacour et al. ............. 96/146 |
| 3,807,149 A | 4/1974 | Norback ....................... 55/338 |
| 4,177,048 A * | 12/1979 | Rivers et al. ............. 96/117.5 |
| 4,289,513 A | 9/1981 | Brownhill et al. ............. 55/387 |
| 4,405,284 A | 9/1983 | Albrecht et al. ............. 415/174 |
| 4,548,046 A * | 10/1985 | Brandon et al. ................ 62/79 |
| 4,637,218 A * | 1/1987 | Tchernev ....................... 62/106 |
| 4,849,102 A | 7/1989 | Latour et al. .......... 210/321.64 |
| 4,849,104 A | 7/1989 | Garcera et al. .......... 210/323.2 |
| 4,915,715 A * | 4/1990 | Oshima et al. ................ 96/118 |
| 5,001,903 A * | 3/1991 | Lessard et al. ............... 62/55.5 |
| 5,120,694 A * | 6/1992 | Dunne et al. .................. 502/68 |
| 5,223,009 A * | 6/1993 | Schuster et al. .............. 96/146 |
| 5,260,243 A * | 11/1993 | Dunne et al. .................. 502/68 |
| 5,266,090 A * | 11/1993 | Burnett ........................ 55/333 |
| 5,338,450 A | 8/1994 | Maurer ........................ 210/286 |
| 5,352,274 A | 10/1994 | Blakley .......................... 95/90 |
| 5,400,830 A | 3/1995 | Stiles et al. .................. 138/149 |
| 5,456,093 A * | 10/1995 | Dunne et al. .................. 62/480 |
| 5,500,037 A * | 3/1996 | Alhamad ....................... 96/108 |
| 5,512,083 A | 4/1996 | Dunne .......................... 95/113 |
| 5,518,977 A | 5/1996 | Dunne et al. .................. 502/68 |
| 5,542,968 A | 8/1996 | Belding et al. ............... 96/125 |
| 5,593,482 A * | 1/1997 | Dauber et al. ............. 96/117.5 |
| 5,650,221 A | 7/1997 | Belding et al. ............. 442/417 |
| 5,667,560 A | 9/1997 | Dunne .......................... 95/113 |
| 5,676,909 A * | 10/1997 | Hollinger, Jr. ................ 422/40 |
| 5,685,897 A | 11/1997 | Belding et al. ............... 96/154 |
| 5,866,079 A | 2/1999 | Machida et al. ............. 422/179 |
| 5,911,937 A | 6/1999 | Hekal .......................... 264/255 |
| 5,965,091 A | 10/1999 | Navarre et al. ............. 422/122 |
| 6,102,107 A | 8/2000 | Dunne .................... 165/104.12 |
| 6,110,261 A * | 8/2000 | Guiragossian ............... 96/117 |

(Continued)

FOREIGN PATENT DOCUMENTS

WO  WO 02/45847  12/2001

*Primary Examiner*—Robert H. Spitzer
(74) *Attorney, Agent, or Firm*—John G. Tolomei; Frank S. Molinaro; Arthur E. Gooding

(57) ABSTRACT

A device is disclosed for cooling motors that generate heat during operation. The device is more specifically directed to handheld power tools where long operation can lead to overheating of the handheld tool.

46 Claims, 4 Drawing Sheets

U.S. PATENT DOCUMENTS

| | | | |
|---|---|---|---|
| 6,130,263 A | 10/2000 | Hekal | 521/50 |
| 6,152,996 A * | 11/2000 | Linnersten et al. | 96/135 |
| 6,190,440 B1 * | 2/2001 | Purnell | 96/108 |
| 6,293,998 B1 | 9/2001 | Dolan et al. | 95/96 |
| 6,342,320 B1 | 1/2002 | Liu et al. | 429/307 |
| 6,444,289 B1 | 9/2002 | Ernest | 428/138 |
| 6,468,334 B1 * | 10/2002 | Incorvia et al. | 96/147 |
| 2001/0000858 A1 * | 5/2001 | Rockenfeller et al. | 95/116 |

* cited by examiner

SORPTION COOLING FOR HANDHELD TOOLS

FIELD OF THE INVENTION

The field of the invention is cooling devices for handheld tools.

BACKGROUND OF THE INVENTION

Small handheld tools are used in a variety of applications. Today, the handheld tools are increasingly converted to powered tools, or small handheld power tools are developed for more applications as in places where the size of the tool is critical to its use. An example is a surgical drill, where the drill is small enough to be handheld, but must have a powerful enough motor to drive a drill bit through bone. These drills can generate a lot of heat during usage.

The heat can degrade the performance of the tool, but also, the tool can heat to a point where it cannot be held, and needs to be laid aside in order to cool down. This interrupts a surgical procedure, and extends the length of time required to perform some surgeries. In addition, a second drill might be required in order to continue the procedure. If the hand held drill is able to be operated at a lower temperature for a longer time, the surgery can be performed in a shorter time. Shorter times on an operating table reduce risk to patients.

SUMMARY OF THE INVENTION

The present invention is an apparatus that is added to a motorized device such as a handheld drill. The invention comprises a hygroscopic material and is positioned in proximity to a motor in the device. Preferably, the material is in good thermal contact with the motor. The material adsorbs moisture from the air when the device is not in use, and during operation of the motorized device, the material heats up. The heat vaporizes the moisture in the material and carries the heat away from the device, allowing for a longer operation of the device.

This invention provides an apparatus for cooling a device without the need of moving parts, which are subject to wear, and without the need for extra power to operate a cooling device.

Other objects, advantages and applications of the present invention will become apparent to those skilled in the art from the following detailed description.

DETAILED DESCRIPTION OF THE INVENTION

Figure 1:
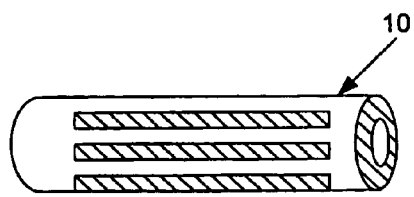
FIG. 1 is one embodiment of the present invention.
Figure 2:
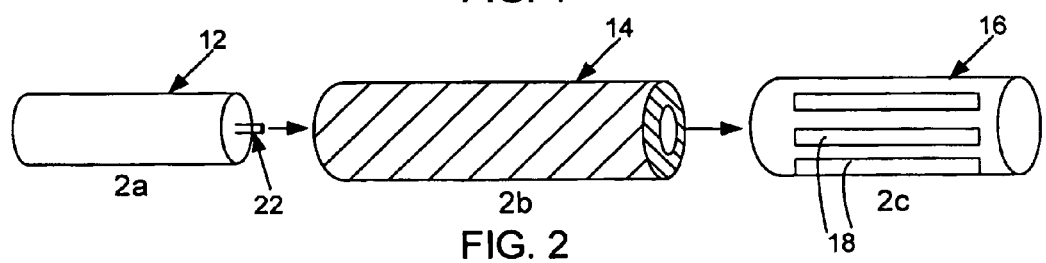
FIGS. 2a–2c are the components of the embodiment shown in FIG. 1.
Figure 3:
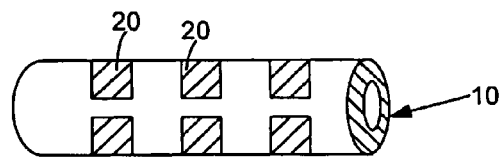
FIG. 3 is another embodiment of the present invention.
Figure 4:
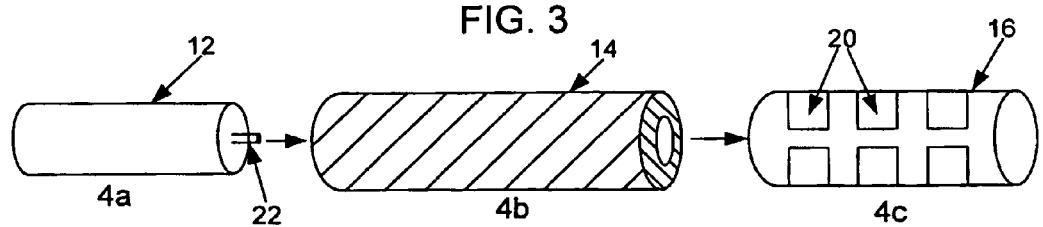
FIGS. 4a–4c are the components of the embodiment shown in FIG. 3.
Figure 5:
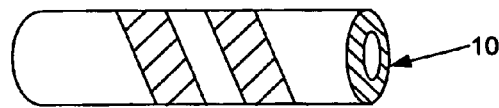
FIG. 5 is another embodiment of the present invention.
Figure 6:
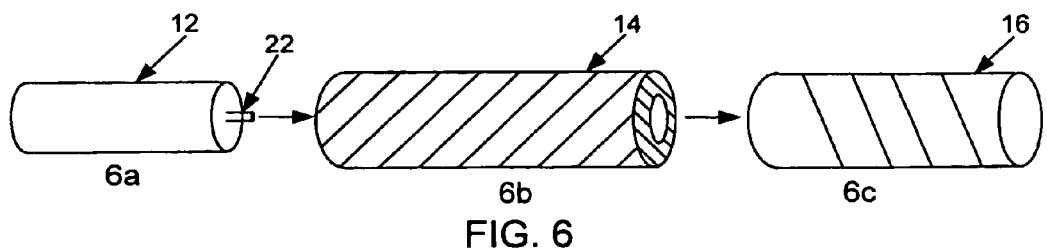
FIGS. 6a–6c are the components of the embodiment shown in FIG. 5.

Several medical procedures involve the use of surgical instruments that have motors and are driven by a power source, usually electrical power. A typical example is a surgical drill having an electric motor. The drill is small and hand held for convenient use when there is a need to drill into a patient's bones. One example of drilling into a patient's bone is for the insertion of pins to hold broken bones in proper alignment. While the drills are small, the motors use a lot of power. The power in turn heats up the hand held tool, or device, and the device can only be run until the temperature is too hot to continue holding the device. While a surgical drill is illustrated as an example, this invention is not limited to a surgical drill, but is applicable to any device with a motor, such as a surgical saw, handheld drill, handheld saw, buffer, polisher, sander, router, power screwdriver, grinder or other motorized devices, that generates heat during its operation. The following description will be in relation to a drill as an example, but not to limited thereto.

The present invention provides an improvement on power generating equipment that is used on an intermittent basis. The invention is the application of an adsorbent material to a drill that generates heat. The adsorbent is a material that will absorb moisture at room temperature when the drill is not in use. When the drill is in use, heat generated by the drill is transferred to the sorbent and adsorbed moisture. When sufficient heat is transferred such that the desorption temperature of water is reached, the water desorbs and carries heat away with the water vapor cooling the drill. This slows the rate at which the drill heats up, and allows for a longer operation of the drill.

One embodiment of the invention is a device that is mounted in a housing. The housing in turn has a layer of adsorbent material applied to the surface of the housing. The adsorbent needs to be applied in a layer of sufficient thickness to provide effective long term cooling while not increasing the size of the hand held device. The thickness of the adsorbent layer should be from about 0.05 mm to about 10 mm, with a preferred thickness of about 1 mm to about 5 mm. The adsorbent material can be applied to the surface of the housing by repeated applications of a slurry, with the slurry containing a liquid phase for carrying an adsorbent as solid particles, and an adhesive material for adhering the adsorbent particles to the housing. As the slurry is dried, the liquid phase is evaporated and the adsorbent particles are affixed to the housing. Repeated applications of the slurry are performed until the desired thickness is achieved. In the alternative, the adsorbent is applied directly to the motor. The process of applying an adsorbent to a surface through layering is known in the art and is described in U.S. Pat. No. 5,518,977, which is incorporated by reference in its entirety.

The adsorbent is a material that can reversibly adsorb and desorb water at a relatively low temperature and includes aluminas and silicas as possible materials. The material preferably adsorbs water at temperatures below about 20° C. and begins to release the water at temperatures above 20° C. The invention is intended to cover any material that adsorbs water below 20° C., and desorbs above 20° C. including non-porous materials though porous materials are preferred. The material will preferably release a substantial amount of the water adsorbed when the temperature is between about 20° C. and 80° C. The porosity allows for greater adsorption of water, and for flow of the water out of the material when the material is heated. Although not limited to, due to the general uniformity of pore sizes, preferred adsorbents are molecular sieves. Among the molecular sieves that are suitable are zeolites such as chabazite, clinoptilolite, erionite, faujasite, zeolite Y, ferrierite, mordenite, zeolite A, zeolite P, zeolite X, and mixtures thereof. Preferred zeolites are those that desorb water at relatively low temperatures, from about 20° C. to about 80° C. Those zeolites may be selected from the group consisting of X and Y zeolites, and more specifically zeolite Y-85, Y-84, LZ-210, Y-74, 13×, Y-54 and DDZ-70. Y-85, Y-84, LZ-210, Y-74, 13×, Y-54, and DDZ-70 are known in the art and found in U.S. Pat. Nos. 5,160,033, 5,456,093, 4,503,023, 5,503,222, and U.S. patent publication 20020066368 which are incorporated by reference in their entireties. DDZ-70 is a rare earth exchanged sodium Y zeolite, such as Y-54, that has been steam calcined, as described in processes in U.S. Pat. Nos. 5,512,083 and 5,667,560 which are incorporated by reference in their entireties. The zeolites preferably have silica to alumina ratios greater than 10. The molecular sieves can be further treated with other specific hygroscopic materials such as inorganic oxides, especially metal oxides from the lanthanum series. Table 1 shows the potential amount of heat removable by example adsorbents. The coefficient of cooling is the amount of energy removed during the desorption of water between temperatures of 25° C. and 80° C. per gram of adsorbent.

TABLE 1

| Powder | Heat of adsorption of water J/gm | wt % water at 25° C. | wt. % water at 80° C. | coefficient of cooling J/gm |
|---|---|---|---|---|
| DDZ-70 | 2335 | 25.5 | 6.6 | 441 |
| Y-84 | 2903 | 21.9 | 8.86 | 379 |
| Y-74 | 2618 | 20.66 | 8.57 | 317 |
| 13X | 3511 | 24.68 | 17.46 | 253 |
| Y-54 | 2941 | 23.5 | 17.5 | 176 |

In another embodiment the adsorbent is formed into a monolithic honeycomb. The monolith can be pressed and sintered into a desired shape, and affixed to the motor or motor housing. The monolith can be made of the adsorbent, or as a ceramic monolith, e.g. cordierite or mullite, which is coated or impregnated with the adsorbent. The monolith can be any inorganic oxide having the above mentioned hygroscopic properties.

The monolith can be bonded to the housing or motor with an adhesive or other means. The selection of means for affixing the sorbent to the housing or motor should include good heat transfer characteristics such as high thermal conductivities. Appropriate bonding materials are known in the art for bonding ceramics to metals, and examples are listed in U.S. Pat. No. 4,405,284, which is incorporated by reference in its entirety. A casing is positioned over the monolith and has openings in the casing. The openings provide for air flow over the sorbent monolith.

In an alternative, the monolith is affixed to the interior surface of the casing, and is either bonded with an adhesive or mechanically affixed with rivets or other equivalent mechanical means.

FIGS. 1 and 2a–c are illustrative of an embodiment of the present invention. The device 10 is a motor 12, surrounded by a sorbent monolith 14, and is inserted into a housing 16. The housing 16 includes openings 18 to allow for the passage of air. The openings 18 are longitudinal rectangular openings in the housing 16. When the device is not in use and the sorbent 14 is near room temperature, the sorbent 14 adsorbs moisture from the surrounding air. When the motor 12 is running, it generates heat. The heat is transferred to the sorbent 14, and as the sorbent 14 heats up, the adsorbed moisture is desorbed and heat generated by the motor is removed keeping the temperature of the device at a comfortable level. If the air is dry, the device can be placed in a moist environment prior to use. This will allow the adsorption of moisture prior to use.

FIGS. 3 and 4a–c are another embodiment of the present invention. In this embodiment, the openings 20 are cut-outs in a direction perpendicular to the direction of a motor shaft 22. FIGS. 5 and 6a–c are an alternate embodiment wherein the casing 16 has cut-outs having a helical shape around the casing surface. The size, shape and number of openings in the casing 16 is dependent on the actual shape and design of the casing 16. The positioning of the openings will generally be situated in sites on the casing where a hand would not be holding the device.

In another embodiment, the invention comprises a motor mounted in a housing. An adsorbent material is mounted on the external surface of the housing. The adsorbent can be applied in layers and bonded to the housing, with subsequent layers bonded to prior layers until a desired thickness is obtained. The invention further comprises a casing for holding the motor with the adsorbent inside, and where the casing 16 has at least one opening for allowing air to flow through.

In an alternate embodiment, the cooling apparatus can be affixed to a device that generates heat. The apparatus comprises a fibrous support material, and an adsorbent embedded within the support material. The adsorbent material is present in a range from about 5% to about 90% of the apparatus by weight. The adsorbent is preferably selected from the adsorbents listed above. The fibrous support forms a porous matrix for the transfer of moisture toward and away from the adsorbent. The support matrix is made from fibrous materials that are selected from the group consisting of cellulosic fibers, synthetic fibers, and mixtures thereof.

The apparatus is formed as a sheet using any method known in the art, as exhibited in U.S. Pat. Nos. 5,542,968, 6,130,263, and 5,911,937, all of which are incorporated by reference. The sheet is formed as a flexible mat from about 0.05 mm to about 10 mm in thickness, with a more preferred thickness of about 2 mm to about 5 mm. In forming the mat to the desired thickness, an alternate preferred structure of the mat is to form thinner sheets having a preferred thickness from about 0.1 mm to about 1 mm and layer the sheets for a thicker mat. The mat can be shaped to fit a handheld device, especially formed to fit the inside surface of a housing holding the device.

In one embodiment, the invention is a disposable device. The invention includes an adsorbent embedded within an inexpensive porous material comprised of a disposable material, such as for example, cellulose fibers. The invention is formed as a sleeve for reversibly sliding over a motor, or other heat generating device. After a limited number of adsorption—desorption cycles, the device is replaced. The sleeve can be formed as a sheet, and the sheet wrapped around a cylindrical body. The sheet is repeatedly wrapped around the body forming a layered structure until the desired thickness is achieved. The body used for preforming the sleeve is not limited to a cylindrical shape, but can be any shape that corresponds to the motor over which the sleeve is applied.

The apparatus may optionally include an adhesive applied to a surface of the mat for adhering the mat to the housing. Adhesives are well known in the art and the choice of adhesive is selected based upon the materials to be adhered, and whether a relatively permanent or temporary affixation is desired. For a temporary, replaceable mat, an adhesive with a low adhesion coefficient would be desired. A temporary, replaceable mat provides for the use of adsorbents and support mats that have a limited useful life as measured in operation cycles.

In an alternative, the adsorbent comprises a portion of a housing for a device that generates heat. A housing is formed that has an inner portion and an outer portion. The inner portion is a porous polymer matrix with an adsorbent embedded within the polymer matrix. The adsorbent comprises from about 5% to about 90% of the inner portion by weight and is preferably an adsorbent selected from the preferred adsorbents listed above. The outer portion of the housing is made of polymeric material that forms a hard shell over the porous polymer matrix, with the outer and inner portions bonded together.

Preferably, the outer portion includes openings for permitting the flow of air from the environment to the inner portion.

Methods of making a porous polymer matrix are known in the art, as exhibited in U.S. Pat. Nos. 6,472,443, 6,471,993, and 6,171,723, all of which are incorporated by reference. The inner portion can be made using a flexible thermoplastic and bonded to the outer portion made from a more rigid material, such as a thermoset.

In an alternative, the inner portion can be made and separately bonded to an existing housing for the device using an appropriate adhesive.

EXAMPLE

Figure 7:
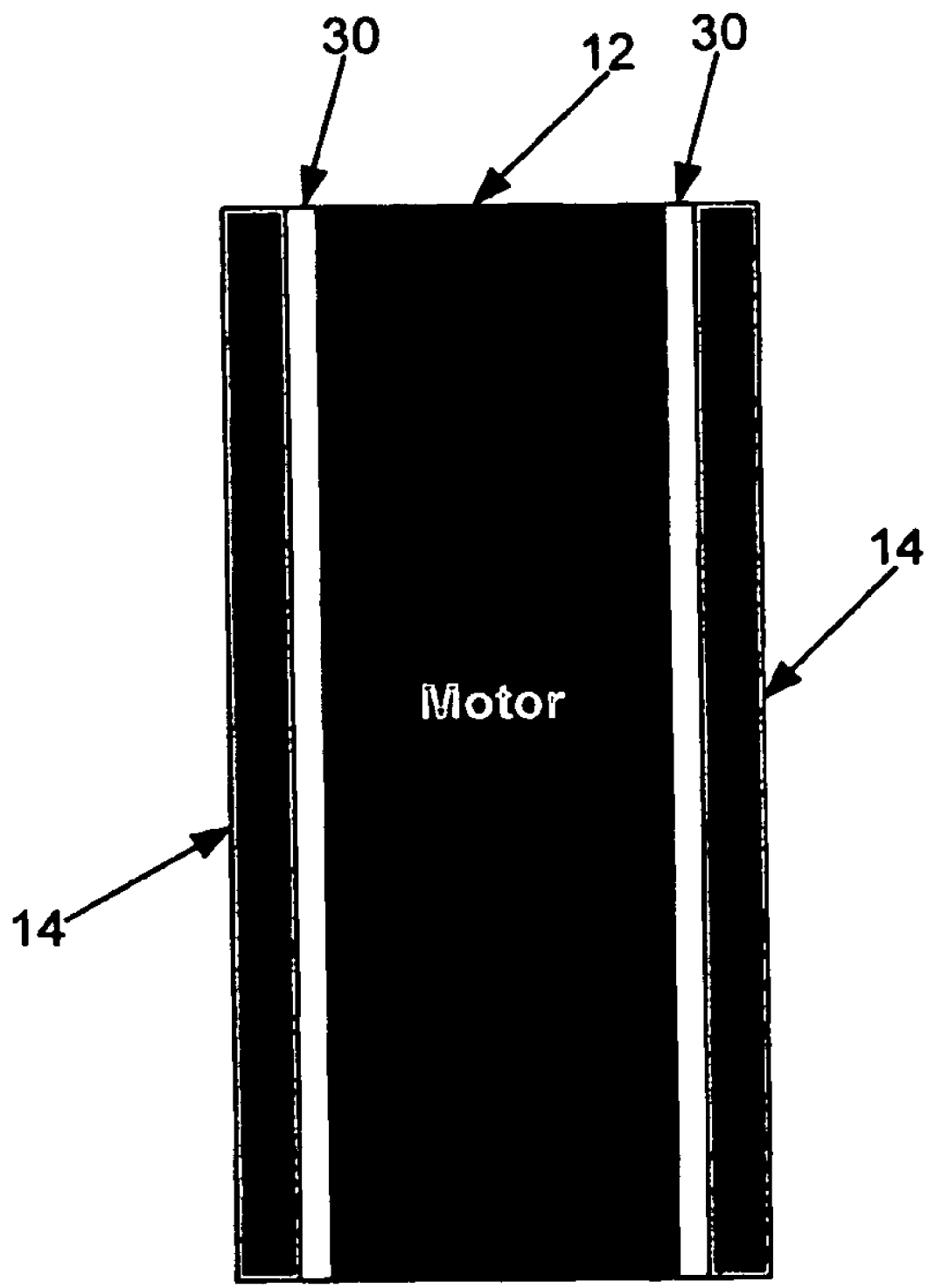
FIG. 7 is a schematic of a motor with an adsorbent layer.

A cooling device on a motor using the desorption heat of water to cool the motor allows for a longer operation of the motor at lower temperatures. Such a cooling device is shown schematically in FIG. 7, as an adsorbent layer 14 surrounding a motor 12. This example also includes an air gap 30. Using a typical bone drill as the motor, the heat generation is about 5 Watts, and a total heat generated by the motor is $Q_T=5 \times t$ where t is the time of operation in seconds. This heat is equal to the heat used to heat the motor, $Q_M$, plus the adsorbent layer, $Q_A$, plus the heat of desorption of water from the layer, $Q_D$, plus heat lost to the environment, $Q_E$:

$$Q_T = Q_M + Q_A + Q_D + Q_E$$

The energy for heating the adsorbent layer, $Q_A$, is much smaller than the other terms, and the equation can be rearranged to give a surface temperature, $T_S$, based upon the heat loss to the environment, or:

with $$Q_E = h_2 \cdot A \cdot \int_0^t (T_s - 37) \, dt = Q_T - Q_M - Q_D \text{ with}$$

$$Q_M = \rho_M \cdot Cp_M \cdot V_M (T_M - 25), \text{ and}$$

$$Q_D = \rho \, V \, \Delta W \, \Delta H$$

In these equations $T_S$ and $T_M$ represent the temperatures of the external surface and the temperature of the motor; $\rho_M$, $Cp_M$, and $V_M$ represent the density, heat capacity and volume of the motor respectively; and $\rho$, V, and $\Delta H$ represent the density, volume, to and desorption heat of the adsorption layer. The amount of cooling is provided by the amount of water, $\Delta W$, removed from the adsorbent layer during operation of the drill. It is desirable to have an adsorbent that releases a lot of water between the temperatures of 25° C. and 70° C. Silica gel is a good adsorbent as it releases 30 g of water for each 100 g of adsorbent when heated from 25° C. to 70° C.

Figure 8:
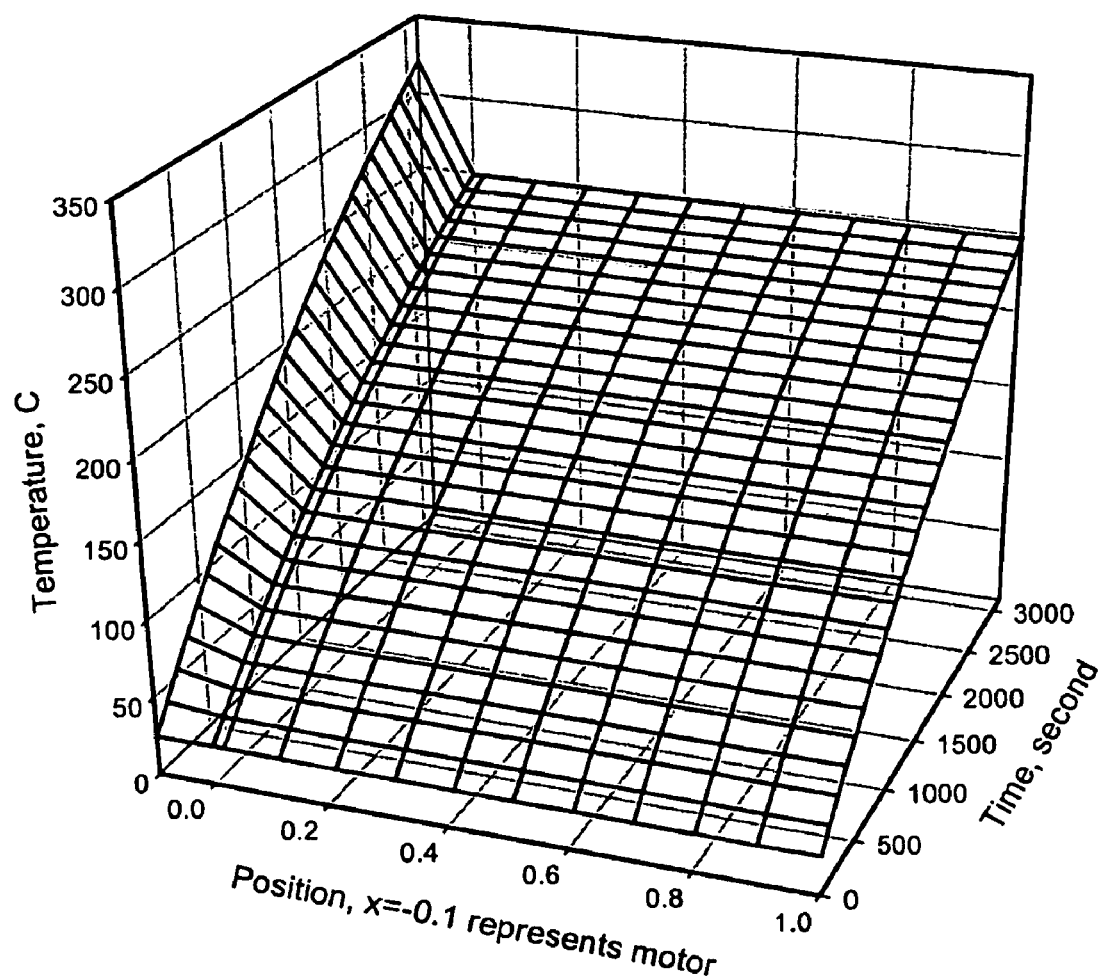
FIG. 8 is the temperature history of the adsorbent layer without desorption.
Figure 9:
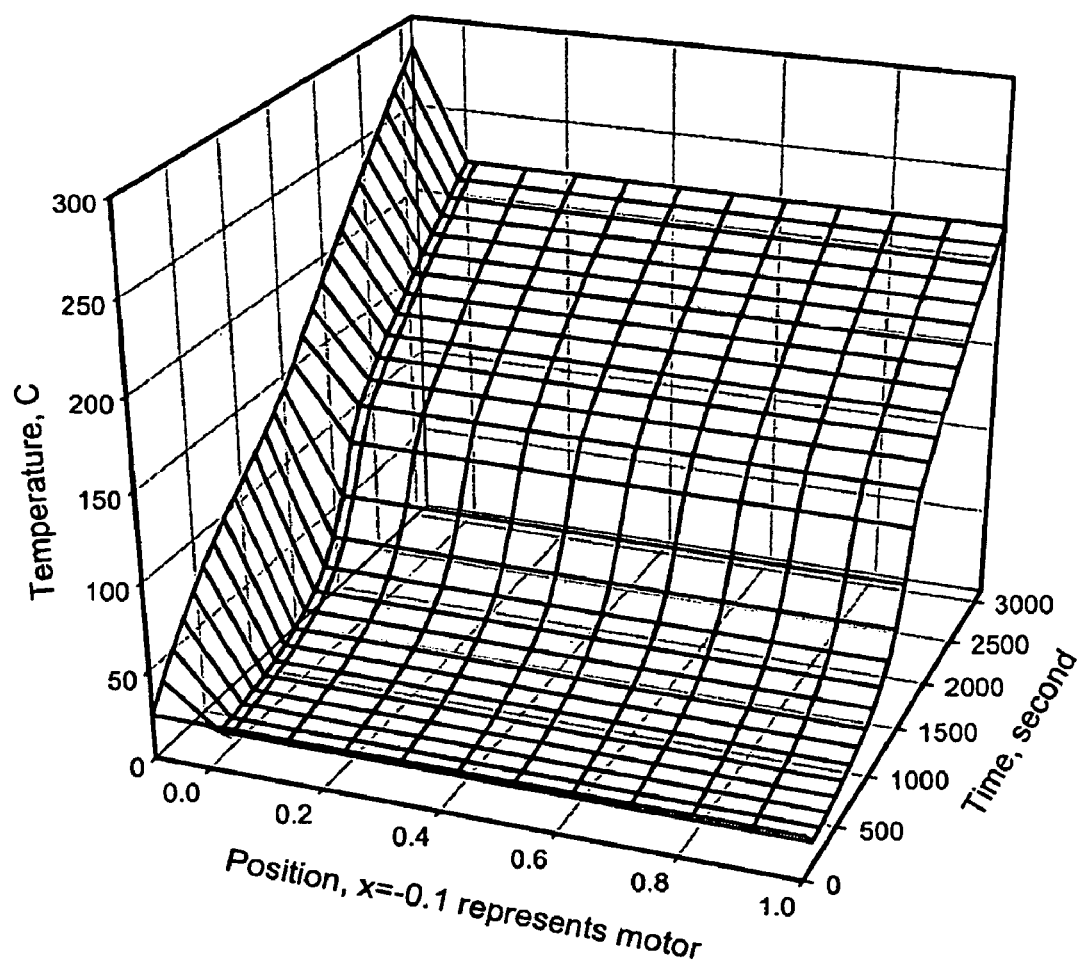
FIG. 9 is the temperature history of the adsorbent layer with desorption cooling.

A simulation was run with an adsorbent layer having a 1 mm thickness and an air gap of 0.1 mm between the motor and adsorbent layer. The simulation was run without the desorption process and with the desorption process. The results are shown in FIGS. 8 and 9. Without desorption the adsorbent layer rapidly heats up and the external surface temperature, $T_S$, reaches 70° C. in about 460 seconds, or a little over 7½ minutes as shown in FIG. 8. With the desorption, a substantial amount of heat is used to desorb the water. As shown in FIG. 9, the time for the surface temperature to reach 70° C. has increased to about 1500 seconds, or about 25 minutes. This demonstrates the cooling effect of an adsorbent.

While the invention has been described with what are presently considered the preferred embodiments, it is to be understood that the invention is not limited to the disclosed embodiments, but it is intended to cover various modifications and equivalent ents included within the scope of the appended claims.

What is claimed is:

1. An apparatus for cooling a device that generates heat comprising:
   a housing for holding the device and having an external surface; and
   an adsorbent material applied to the external surface of the housing.

2. The apparatus of claim 1 further comprising a casing covering the adsorbent material and including at least one opening for the flow of air.

3. The apparatus of claim 2 further comprising an insulation layer affixed to the casing.

4. The apparatus of claim 1 wherein the adsorbent material desorbs water at a temperature in the range from about 20° C. to about 80° C.

5. The apparatus of claim 1 wherein the device is a motor.

6. The apparatus of claim 5 wherein the motor is an electric motor in a hand held tool.

7. The apparatus of claim 6 wherein the handheld tool is selected from the group consisting of handheld drills, surgical drills, handheld saws, buffers, polishers, sanders, routers, power screwdrivers, and grinders.

8. The apparatus of claim 1 wherein the adsorbent material has a thickness of between about 0.05 mm and about 10 mm.

9. The apparatus of claim 8 wherein the adsorbent material has a thickness of about 2 mm to about 5 mm.

10. The apparatus of claim 8 wherein the material is layered and each layer has a thickness between about 0.05 mm and 1 mm.

11. The apparatus of claim 8 wherein the adsorbent is a zeolite with silica to alumina ratios greater than 10.

12. The apparatus of claim 11 wherein the zeolite has silica to alumina ratios greater than 100.

13. The apparatus of claim 1 wherein the adsorbent is a molecular sieve.

14. The apparatus of claim 1 wherein the adsorbent is a material selected from the group consisting of chabazite, clinoptilolite, erionite, faujasite, ferrierite, mordenite, zeolite A, zeolite P, zeolite X, zeolite Y, zeolite Y-85, low cerium exchanged zeolite Y-84, rare earth exchanged LZ-210, Y-74, Y-54, 13x, DDZ-70 and mixtures thereof.

15. The apparatus of claim 1 wherein the adsorbent material is a hygroscopic porous monolith.

16. An apparatus for reducing the heating rate of a device that generates heat comprising:
a housing for holding the device, wherein the housing has an interior surface and at least one opening for the flow of air; and
an adsorbent material applied to the interior surface of the housing.

17. The apparatus of claim 16 wherein the device is a handheld tool using an electric motor.

18. The apparatus of claim 16 wherein the adsorbent is a hygroscopic material.

19. The apparatus of claim 16 wherein the adsorbent is a molecular sieve.

20. The apparatus of claim 19 wherein the molecular sieve is selected from the group consisting of chabazite, clinoptilolite, erionite, faujasite, zeolite Y, ferrierite, mordenite, zeolite A, zeolite P, zeolite X, zeolite Y, zeolite Y-85, low cerium exchanged zeolite Y-84, rare earth exchanged LZ-210, Y-74, Y-54, 13x, DDZ-70, and mixtures thereof.

21. The apparatus of claim 16 wherein the adsorbent is a hygroscopic porous monolith affixed to the housing.

22. An apparatus for cooling a motor comprising:
an electric motor having an external surface; and
an adsorbent material applied to the external surface of the motor.

23. The apparatus of claim 22 further comprising a housing for holding the motor, wherein the housing has at least one opening for the flow of air.

24. The apparatus of claim 23 further comprising an insulating layer affixed to the housing, wherein the insulating layer has openings corresponding to the openings in the housing.

25. The apparatus of claim 22 wherein the adsorbent is a hygroscopic molecular sieve.

26. The apparatus of claim 25 wherein the molecular sieve is selected from the group consisting of chabazite, clinoptilolite, erionite, faujasite, zeolite Y, ferrierite, mordenite, zeolite A, zeolite P, zeolite X, zeolite Y, zeolite Y-85, low cerium exchanged zeolite Y-84, rare earth exchanged LZ-210, Y-74, Y-54, 13x, DDZ-70 and mixtures thereof.

27. An apparatus for cooling a device that generates heat and has an external surface comprising:
a fibrous support material selected from the group consisting of cellulosic fibers, synthetic fibers, and mixtures thereof, and having a first surface and a second surface; and
an adsorbent material embedded in the fibrous support material and present in the support in the range from about 5% to about 90% by weight.

28. The apparatus of claim 27 further comprising an adhesive applied to the first surface of the support material.

29. The apparatus of claim 28 wherein the first surface of the support material is affixed to the external surface of the device.

30. The apparatus of claim 28 further comprising:
a housing for holding the device that generates heat and having an internal surface and external surface, wherein the support material is affixed to one of the housing internal and external surfaces.

31. The apparatus of claim 27 wherein the adsorbent material is selected from the group consisting of chabazite, clinoptilolite, erionite, faujasite, zeolite Y, ferrierite, mordenite, zeolite A, zeolite P, zeolite X, zeolite Y-85, low cerium exchanged zeolite Y-84, rare earth exchanged LZ-210, Y-74, Y-54, 13X, DDZ-70, and mixtures thereof.

32. The apparatus of claim 27 wherein the apparatus is a disposable fibrous support.

33. The apparatus of claim 32 wherein the adhesive is a material having relatively low coefficient of adhesion.

34. The apparatus of claim 27 wherein the support material with the adsorbent embedded within is formed in a sheet having a thickness from about 0.05 mm to about 10 mm.

35. The apparatus of claim 34 wherein the sheet is layered with each layer having a thickness from about 0.05 mm to about 5 mm.

36. The apparatus of claim 34 wherein the sheet is preformed.

37. The apparatus of claim 34 wherein the sheet is held onto the device by friction.

38. The apparatus of claim 27 wherein the adsorbent begins to desorb water at temperatures above 20° C.

39. The apparatus of claim 27 wherein the synthetic fibers are made from a thermoplastic.

40. The apparatus of claim 27 wherein the fibrous support material has a thickness from about 0.05 mm to about 8 mm.

41. An apparatus for cooling a motor that generates heat comprising:
a housing having an inner portion and an outer portion; and
an adsorbent embedded in the housing inner portion;
wherein the inner portion comprises a porous polymer matrix, and the outer portion comprises a polymer material.

42. The apparatus of claim 41 wherein the outer portion is fabricated with openings for permitting air flow to the interior portion of the housing.

43. The apparatus of claim 41 wherein the polymer material of the outer portion is a thermoplastic.

44. The apparatus of claim 41 wherein the polymer material of the outer portion is a thermoset.

45. The apparatus of claim 41 wherein the adsorbent is a material that adsorbs moisture from the air at temperatures below 20° C.

46. The apparatus of claim 41 wherein the adsorbent is a material that desorbs moisture at temperatures from about 20° C. to about 80° C.

* * * * *

UNITED STATES PATENT AND TRADEMARK OFFICE
CERTIFICATE OF CORRECTION

PATENT NO. : 7,033,421 B1  
APPLICATION NO. : 10/347931  
DATED : April 25, 2006  
INVENTOR(S) : Suzanne E. Smith et al.

Page 1 of 1

It is certified that error appears in the above-identified patent and that said Letters Patent is hereby corrected as shown below:

<u>Column 6,</u>
Line 67, replace "13x" with --13X--.

<u>Column 7</u>
Line 21, replace "13x" with --13X--.
Line 42, replace "13x" with --13X--.

Signed and Sealed this

Fifth Day of September, 2006

JON W. DUDAS  
*Director of the United States Patent and Trademark Office*